United States Patent

Takekawa et al.

[11] Patent Number: 5,915,070
[45] Date of Patent: Jun. 22, 1999

[54] MOTOR DRIVING APPARATUS FOR PULSE-WIDTH MODULATION CONTROLLING A DC VOLTAGE ACCORDING TO A ROTATION SPEED SETTING INFORMATION

[75] Inventors: Yoriyuki Takekawa; Nobukazu Takagi, both of Konan-machi, Japan

[73] Assignee: Zexel Corporation, Tokyo, Japan

[21] Appl. No.: 08/991,898

[22] Filed: Dec. 17, 1997

[30] Foreign Application Priority Data

Dec. 30, 1996 [JP] Japan ................................. 8-358711

[51] Int. Cl.$^6$ .................................................. H02P 5/178
[52] U.S. Cl. ........................................ 388/811; 318/440
[58] Field of Search ................................. 388/806, 811, 388/815, 819, 822, 909, 928.1; 318/254, 439, 138, 105, 109, 440, 442; 363/16, 23, 26, 37, 126; 367/45

[56] References Cited

U.S. PATENT DOCUMENTS

| | | | |
|---|---|---|---|
| 4,511,827 | 4/1985 | Morinaga et al. | 318/254 |
| 4,656,571 | 4/1987 | Umezu | 363/37 |
| 4,685,039 | 8/1987 | Inou et al. | 363/16 |
| 4,743,815 | 5/1988 | Gee et al. | 381/254 |
| 4,855,652 | 8/1989 | Yamashita et al. | 318/268 |
| 4,879,498 | 11/1989 | Shinohara et al. | 318/254 |
| 5,119,283 | 6/1992 | Steigerwald et al. | 363/37 |
| 5,383,109 | 1/1995 | Maksimovic et al. | 323/222 |
| 5,654,884 | 8/1997 | Mohan | 363/126 |
| 5,661,348 | 8/1997 | Brown | 307/43 |

*Primary Examiner*—Jonathan Wysocki

[57] ABSTRACT

A motor driving apparatus PWM-controls a DC voltage from a rectifying unit according to a rotation speed setting information, and drives a motor by voltage pulse chooped by PWM. The rectifying unit is controlled so that a full-wave rectification is performed when the motor runs at a rotation speed below a prescribed rotation speed and a voltage-doubler rectification is performed when the motor runs at a rotation speed above the prescribed rotation speed. On the other hand, in case a motor drives a compressor of an air-conditioning system, the rectifying unit is controlled so that the full-wave rectification is performed when the air-conditioning system is a cooling operation and the voltage-doubler rectification is performed when the air-conditioning system is a heating operation. When the rectifying unit is controlled for the full-wave rectification, even if a width of voltage pulse given to the motor is decreased, a voltage value of the voltage pulse is half as compared with the voltage-doubler rectification. Hence, since a motor current is small and its current variation is also small, a hysteresis loop due to a variation in magnetic flux becomes small and an iron loss is reduced. When the rectifying unit is controlled for the voltage-doubler rectification, since a DC voltage which is the double of that of the full-wave rictification is supplied, the motor capacity can be increased.

29 Claims, 8 Drawing Sheets

MOTOR DRIVING APPARATUS FOR PULSE-WIDTH MODULATION CONTROLLING A DC VOLTAGE ACCORDING TO A ROTATION SPEED SETTING INFORMATION

BACKGROUND OF THE INVENTION

The present invention relates to a motor driving apparatus for driving a motor by impressing a DC voltage to the motor through a PWM (Pulse-Width Modulation) control according to a rotation speed setting information.

As an example of motor driving apparatus of this type, a driving apparatus for a commutator less DC motor is known. This apparatus has motor drive windings of a fixed three-phase Y-connection, a permanent magnet rotor, and three-phase bridge-connected six switching elements as a commutator. A DC power source is impressed to the motor drive windings via the switching elements. Each switching element is made on/off by commutation control signals given based on a position detection of the permanent magnet rotor, for example, based on induced voltages which are induced in the motor drive windings. By this, a motor current is commutated, and the permanent magnet rotor rotates. The commutation control signals given to each switching element are PWM-controlled according to a rotation speed setting information, that is, a pulse width of commutation control signals are varied by PWM control according to the rotation speed setting information. By this, an average voltage impressed to the motor drive windings, namely a rotation speed of the motor is varied.

By the way, in such a driving apparatus, a maximum rotation speed of the motor is limited by a voltage of the DC power source which is impressed to the switching elements composing the commutator. That is, since the induced voltages in the motor drive windings are increased accordingly as the rotation speed of the motor is increased, when the induced voltages reach a voltage which is given by the commutation control signals with 100% duty ratio, no current flows into the motor drive windings and the rotation speed stops increasing further. Hence, from the viewpoint of expanding a rotation sphere of the motor, a high voltage is desired as a voltage of the DC power source.

However, when the voltage of the DC power source is set high based on the above-mentioned viewpoint, the rotation area of the motor is expanded, but as a high DC voltage is impressed to the motor via PWM chopping, a variation in motor current becomes large particularly in low and medium-speed rotation zones. Because of this, there is a problem that a hysteresis loop due to variation in magnetic flux becomes large, causing an increase in iron loss.

Figure 8A:
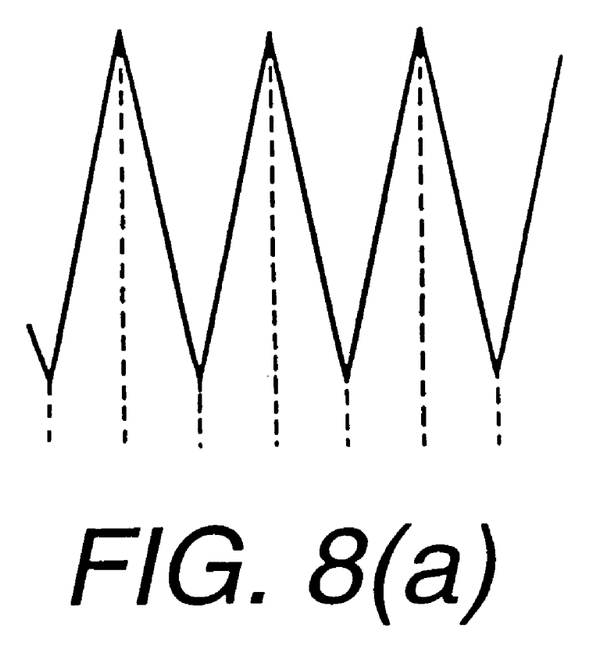
FIG. 8 is an explanatory drawing for explaining an increase in iron loss.
Figure 8B:
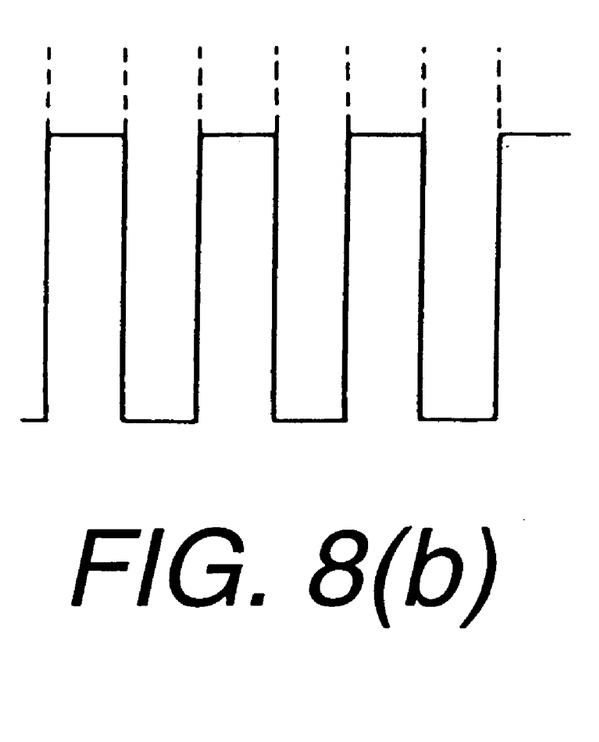

FIG. 8 is an explanatory drawing for explaining an increase in iron loss. In FIG. 8, a waveform (a) shows a current flowing through the motor drive windings and a waveform (b) shows a voltage impressed to the motor drive windings. When the rotation speed of the motor is low, a pulse width of the commutation control signals given to the switching elements via PWM chopping is decreased, and a width of the voltage pulse impressed to the drive windings is also decreased. Therefore, as shown in FIG. 8, the motor current (a) is a sawtooth wave with a large amplitude, causing an increase in current variation. Because of this, if the voltage of the DC power source is set high, a voltage value of the voltage pulse impressed to the drive windings is high, the motor current (a) is also large and the current variation is increased further. Therefore, if the voltage of the DC power source is set high, the hysteresis loop due to variation in magnetic flux becomes large, and the iron loss is increased further.

SUMMARY OF THE INVENTION

It is an object of the present invention to provide an improved motor driving apparatus.

Another object of the present invention is to provide a motor driving apparatus which can reduce an iron loss due to PWM control and can improve the motor efficiency.

The above and other objects are attained by a motor driving apparatus for PWM-controlling a DC voltage according to a rotation speed setting information, and driving a motor by the voltage pulse chopped by PWM, comprising: a rectification device for full-wave rectifying or voltage-doubler rectifying an AC power source, and supplying a full-wave rectified or voltage-doubler rectified voltage as said DC voltage; and a rectification control device, responsive to a rotation speed of the motor, for controlling said rectification device so that the rectification device performs the full-wave rectification when the rotation speed of the motor is below a prescribed rotation speed and the voltage-doubler rectification when the rotation speed of the motor is above the prescribed rotation speed.

According to a composition like this, when the motor rotates at a rotation speed below the prescribed rotation speed, the full-wave rectified DC voltage is given to the motor, and when the motor rotates at a rotation speed above the prescribed rotation speed, the voltage-doubler rectified DC voltage, which is twice as large as the full-wave rectified DC voltage, is given to the motor. Since a low voltage is supplied for a rotation below the prescribed rotation speed, a variation of motor current due to PWM control becomes small and an iron loss can be reduced. What is more, since a high voltage is supplied for a rotation above the prescribed rotation speed, a rotation area of the motor is not narrowed.

The above and other objects are also attained by a motor driving apparatus, having a motor for driving a compressor of an air-conditioning system, for PWM-controlling a DC voltage according to a rotation speed setting information, and driving the motor by the voltage pulse chopped by PWM, comprising: a rectification device for full-wave rectifying or voltage-doubler rectifying an AC power source, and supplying a full-wave rectified or voltage-doubler rectified voltage as said DC voltage; and a rectification control device, responsive to a heating/cooling information demanding a heating or cooling operation of the air-conditioning system, for controlling the rectification device so that the rectification device performs the full-wave rectification when the air-conditioning system is the cooling operation and the voltage-doubler rectification when the air-conditioning system is the heating operation.

According to a composition like this, when the air-conditioning system is in the cooling operation, the full-wave rectified DC voltage is given to the motor, and when the air-conditioning system is in the heating operation, the voltage-doubler rectified DC voltage is given to the motor. In the cooling operation, since a voltage below that in the heating operation is supplied, a variation of motor current due to PWM control becomes small and an iron loss can be reduced. In the cooling operation as compared with the heating operation, since the motor for driving the compressor does not need to run at a high rotation, it is not inconvenience to the cooling operation even when the DC voltage supplied via PWM control is lowered.

BRIEF DESCRIPTION OF THE DRAWINGS

The foregoing and other objects, features and attendant advantages of the present invention will be appreciated as the same become better understood by means of the following description and accompanying drawings wherein.

DETAILED DESCRIPTION OF THE INVENTION

Figure 1:
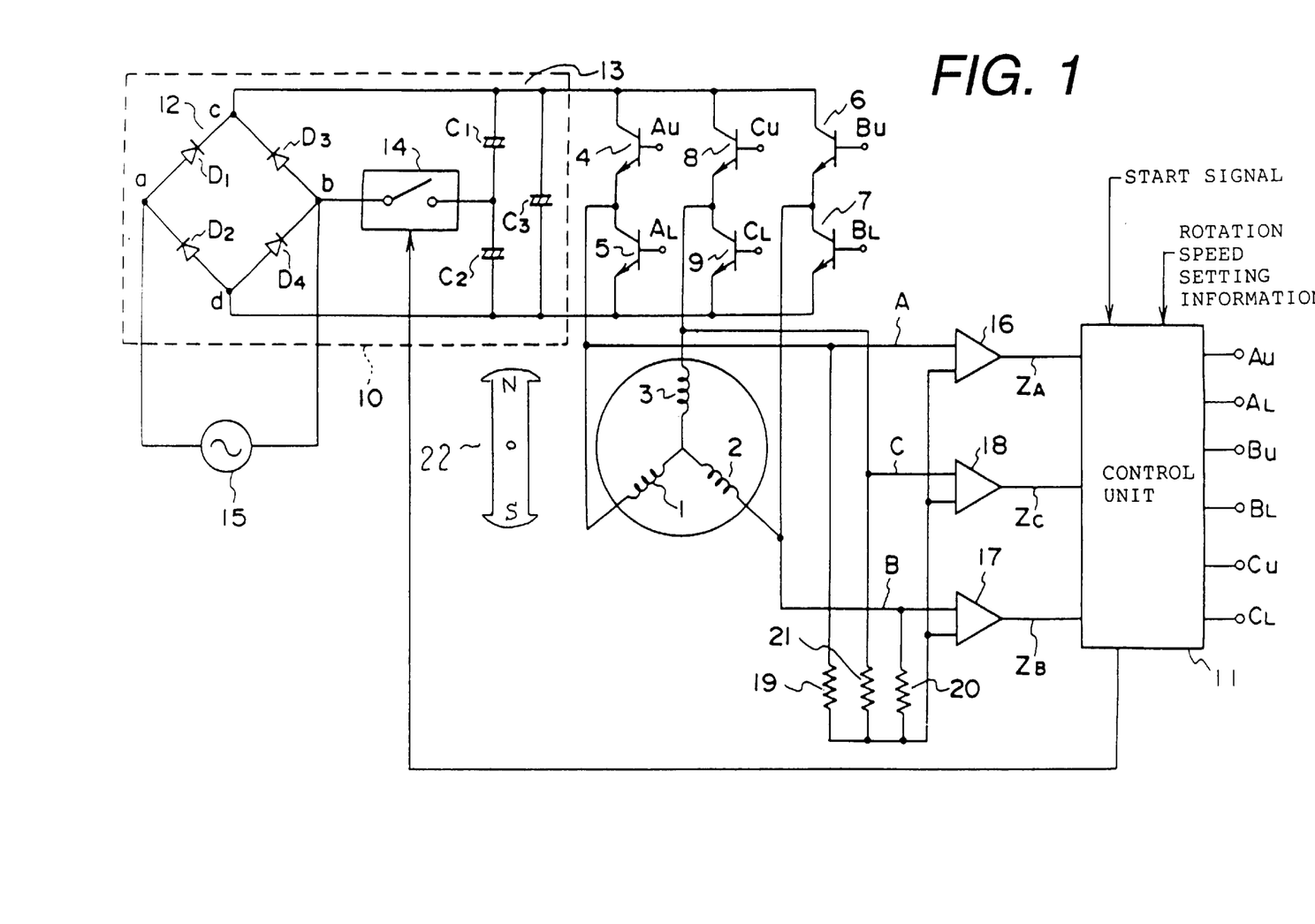
FIG. 1 is a composition drawing showing a first embodiment according to the present invention.
Figure 2:
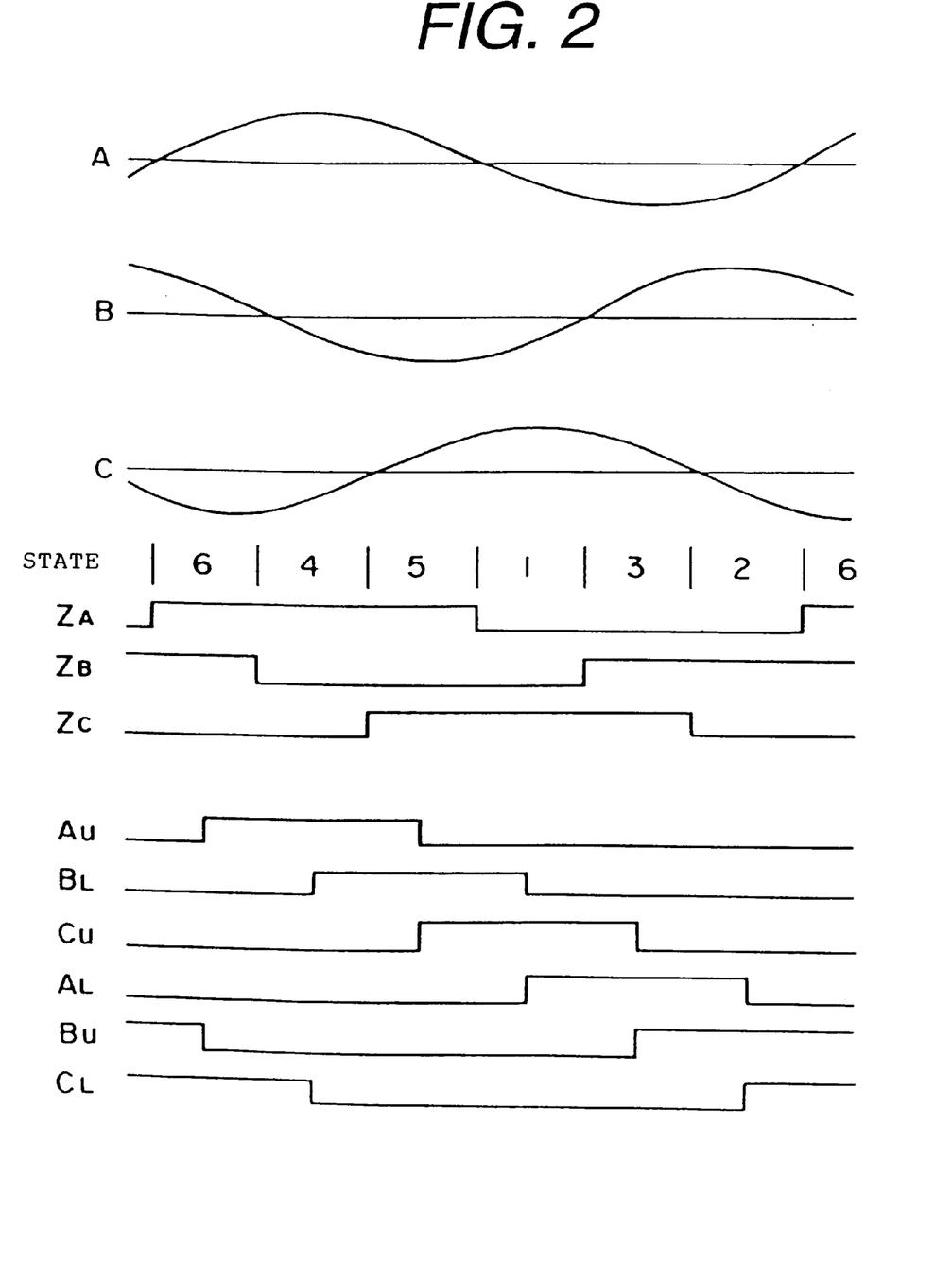
FIG. 2 is a waveform drawing showing induced voltages, sensorless signals and commutation control signals in the composition of FIG. 1.

FIG. 1 is a composition drawing showing a first embodiment according to the present invention. FIG. 2 is a waveform drawing showing induced voltages A, B and C, sensorless signals ZA, ZB, and ZC and commutation control signals AU, AL, BU, BL, CU and CL in the composition of FIG. 1.

In FIG. 1, reference numerals 1, 2 and 3 are drive windings of a commutator less DC motor. The drive windings 1–3 are a three-phase Y-connection. The drive windings 1–3 are fixed to the motor. A reference numeral 22 is a permanent magnet rotor of the commutator less DC motor. Reference numerals 4, 5, 6, 7, 8 and 9 are switching transistors for controlling a commutation of currents of the drive windings 1–3. The switching transistors 4–9 are a three-phase bridge connection. A reference numeral 10 is rectification device for impressing a DC voltage to a collector-emitter circuit of the bridge connection of switching transistors 4–9. The switching transistors 4–9 at their bases receive the commutation control signals Au–CL from a control unit 11. The commutation control signals Au–CL are generated based on the sensorless signals ZA–ZC, chopped by a PWM (Pulse-Width Modulation) so that the motor rotates at a rotation speed according to a rotation speed setting information, and given to the switching transistors 4–9. The switching transistors 4–9 are on-off controlled according to the commutation control signals Au–CL, and thereby the currents of the drive windings 1–3 commutate and the permanent magnet rotor 22 rotates. Also, by the PWM control of the commutation control signals Au–CL according to the rotation speed setting information, an average voltage impressed to the drive windings 1–3 is varied and the rotation speed of the motor is controlled.

The rectification device 10 has a single-phase bridge rectifier circuit 12 having diodes D1, D2, D3 and D4, a condenser circuit 13 having electrolytic condensers C1, C2 and C3, and switching device 14. Input terminals a and b of the single-phase bridge rectifier circuit 12 are connected to an AC power source 15. In this embodiment, for example the AC power source 15 is AC 100V. In the condenser circuit 13, a serial connection of the condensers C1 and C2 is connected to output terminals c and d of the rectifier circuit 12, and the condenser C3 is connected to the output terminals c and d of the rectifier circuit 12 in parallel with the serial connection of the condensers C1 and C2. The switching device 14 at its one end is connected to the input terminal b of the rectifier circuit 12, and at its another end is connected between the condensers C1 and C2 of the condenser circuit 13.

The rectification circuit 10 acts as full-wave rectification when the switching circuit 14 is in an off state. Hence, in this embodiment, the condenser circuit 13 is charged to 141V, and this DC voltage of 141V is supplied to the collector-emitter circuit of the switching transistors 4–9. That is, when the switching circuit 14 is in the off state, a half-wave of the AC power source 15 flows through the input terminal a→the diode D1→the output terminal c→the condenser circuit 13→the output terminal d→the diode D4→the input terminal b, and the next half-wave flows through the input terminal b→the diode D3→the output terminal c→the condenser circuit 13→the output terminal d→the diode D2→the input terminal a. By this, the full-wave rectification is performed, and the DC voltage of 141V is supplied to the switching transistors 4–9.

On the other hand, when the switching means 14 is in an on state, the rectification device 10 acts as voltage-doubler rectification. Hence, the condenser circuit 13 is charged to 282V, which is twice as large as that of the full-wave rectification, and this DC voltage of 282V is supplied to the collector-emitter circuit of the switching transistors 4–9. That is, when the switching device 14 is in the on state, a half-wave of the AC power source 15 flows through the input terminal a→the diode Dl→the output terminal c→the condenser C1 of the condenser circuit 13→the switching device 14→the input terminal b. By this, the condenser C1 of the condenser circuit 13 is charged to 141V. The next half-wave flows through the input terminal b→the switching device 14→the condenser C2 of the condenser circuit 13→the output terminal d→the diode D2→the input terminal a. By this, the condenser C2 of the condenser circuit 13 is charged to 141V. Hence, the voltage-doubler rectification in which the condenser C3 of the condenser circuit 13 is charged to 282V, which is the double of 141V, is performed, and this DC voltage of 282V is supplied to the switching transistors 4–9.

The diodes D3 and D4 of the single-phase bridge rectifier circuit 12 function actively as rectifying elements in the full-wave rectification, and in the voltage-doubler rectification, function as a protection to prevent the polarity of the condenser circuit 13 from being inverted due to overloading and so on.

The switching device 14 is controlled to the off state by the control unit 11 when the rotation speed of the commutator less DC motor is below a prescribed rotation speed, and controlled to the on state by the control unit 11 when the rotation speed of the commutator less DC motor is above the prescribed rotation speed. The prescribed rotation speed is set for a value below a maximum rotation speed that is available at a full-wave rectified DC voltage. In this embodiment, the full-wave rectified DC voltage is 141V.

When the commutator less DC motor is rotating, the induced voltages A, B and C are generated in the drive windings 1–3. Reference numerals 16, 17 and 18 are comparators. The comparators 16–18 input the induced voltages A–C and a neutral point potential, and output the pulse-shaped sensorless signals ZA, ZB, and Zc to the control unit 11. The neutral point potential is given by resistors 19, 20 and 21 which constitute a virtual neutral point of the drive windings 1–3. The sensorless signals ZA–ZC at their rising and falling edges represent a zero-cross point of the induced voltages A–C.

The control unit 11 inputs, in addition to the sensorless signals ZA–Zc from the comparators 16–18, a start signal and the rotation speed setting information, and controls a starting and running of the commutator less DC motor and an on-off of the switching device 14 of the rectification device 10.

The control unit 11 performs the starting of the commutator less DC motor, as described below. First, the control unit 11 gives synchronizing signals to the bases of the switching transistors 4–9, and gradually increases a frequency of the synchronizing signals. Hence, a revolving magnetic field with a gradually increasing rotation speed is generated in the drive windings 1–3, and the permanent magnet rotor 22 starts rotating. Then, after a lapse of a predetermined time causing a state under which the induced voltages A–C are stably outputted, or after the motor attained to a predetermined rotation speed causing a state under which the induced voltages A–C are stably outputted, the control unit 11 generates the commutation control signals Au–CL based on the induced voltages A–C, namely the sensorless signals ZA–Zc, and switches over to a sensorless operation by the commutation control signals AU–CL.

The control unit 11 performs the sensorless operation of the commutator less DC motor, as described below.

Figure 3:
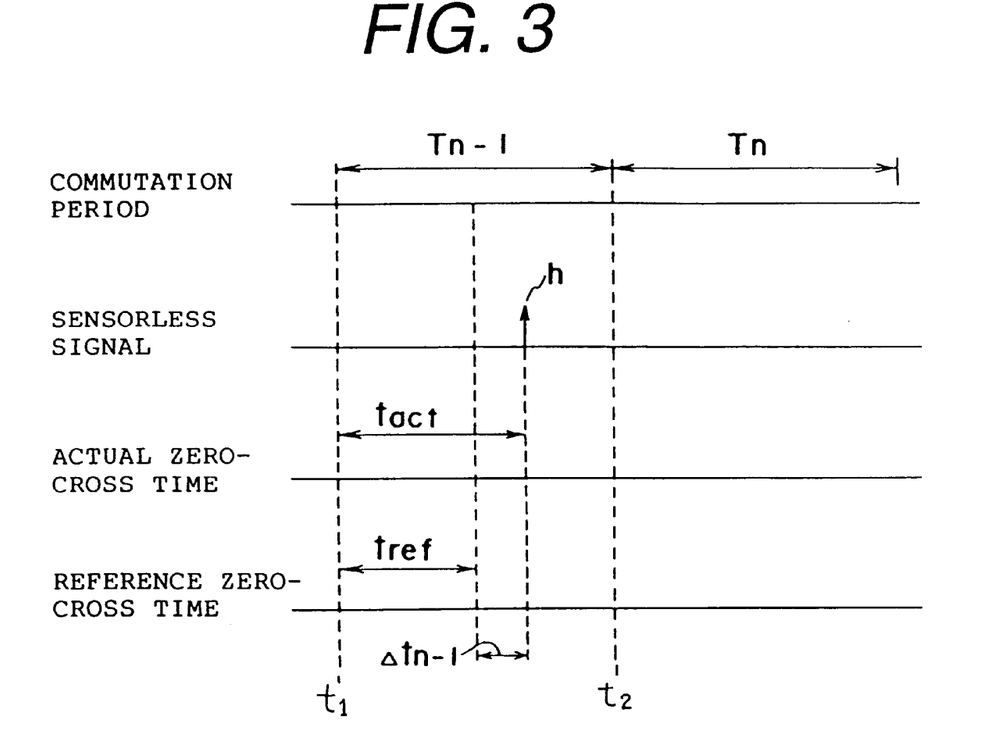
FIG. 3 is an explanatory drawing for explaining a sensorless operation of a commutator less DC motor FIG. 1.

FIG. 3 is an explanatory drawing for explaining the sensorless operation of the commutator less DC motor. In FIG. 3, a reference symbol Tn-1 is a current commutation period, a reference symbol Tn is a next commutation period, a reference symbol h is a rising or falling edge of the sensorless signals ZA–ZC, and a reference symbol tact is an actual zero-cross time. The actual zero-cross time tact represents an actual time width from a start of the current commutation period Tn-1 until the rising or falling edge h of the sensorless signals ZA–ZC is given. A reference symbol tref is a reference zero-cross time. The reference zero-cross time tref represents a desirable time width at which the rising or falling edge h of the sensorless signals ZA–Zc should be generated after the current commutation period Tn-1 is started.

In the beginning of switching from the starling to the sensorless running, the control unit 11 sets a prescribed commutation period and gives prescrived commutaton control signals to the switching transistors 4–9. By this, a commutation occurs at a time point t1, and the current commutation period Tn-1 is started. When the current commutation period Tn-1 is started, the control unit 11 sets a next commutation timing based on the current commutation period Tn-1, and detects the actual zero-cross time tact which is the time width until the rising or falling edge h of the sensorless signals ZA–Zc actually appears. The next commutation timing is an end of the current commutation period Tn-1, namely a time point t2. When the next commutation timing or the time point t2 is reached, the control unit 11 gives the commutation control signals AU–CL to the switching transistors 4–9 after PWM-chopping the commutation control signals AU–CL according to the rotation speed setting information. The commutation control signals AU–CL are predetermined according to a state of the sensorless signals ZA–ZC as described later, and the commutation control signals AU–CL corresponding to a current state of the sensorless signals ZA–ZC are given to the switching transistors 4–9. Hence, a new commutation is generated.

The control unit 11 determines the next commutation period Tn as described. First, the reference zero-cross time tref is set based on the current commutation period Tn-1.

$$tref=(j/k)\cdot Tn\text{-}1$$

In the formula mentioned above, (j/k)×Tn-1 represents a time width to the j-th of the equally divided k parts of the current commutation period Tn-1. In this embodiment, j and k are respectively j=1 and k=2, and the reference zero-cross time tref is set to tref=(½)·Tn-1 so that the reference zero-cross time tref comes to a center of commutation period. After setting the reference zero-cross time tref, a difference Δtn-1 of the reference zero-cross time tref and the actual zero-cross time tact is calculated.

$$\Delta tn\text{-}1=tref-tact$$

Based on the difference Δtn-1, an integrated value Tin of the next commutation period Tn is calculated.

$$Tin=Ki\cdot\Delta tn\text{-}1+Tin\text{-}1$$

In the formula mentioned above, Ki is an integration constant, and Tin-1 is an integrated value of the current commutation period Tn-1. Based on the difference Δtn-1 and the integrated value Tin of the next commutation period Tn, the next commutation period Tn is calculated so that the rising or falling edge h of the sensorless signals ZA–ZC is generated at the reference zero-cross time tref.

$$Tn=Kp\cdot\Delta tn\text{-}1+Tin$$

In the formula mentioned above, Kp is a proportional constant.

When the next commutation period Tn is determined, a new commutation timing is set based on this commutation period Tn, and a new actual zero-cross time tact is detected. And, as described above, when the commutation timing is reached, the commutation control signals AU–CL which are predetermined according to the state of the sensorless signals AU–ZC are outputted after PWM-chopping according to the rotation speed setting information.

The control unit 11 assigns either "0" or "1" to the commutation control signals AU–CL according to the state of the sensorless signals ZA–ZC. The sensorless signals ZA–ZC have a first state to a sixth state, as shown in FIG. 2. In this embodiment, when the sensorless signals ZA–ZC are in the first state of ZA–ZC=(0, 0, 1), the commutation control signals AU–CL are AU=0, AL=1, BU=0, BL=0, CU=1 and CL=0. When the sensorless signals ZA–ZC are in the second state of ZA–ZC=(0, 1, 0), the commutation control signals AU–CL are AU=0, AL=0, BU=1, BL=0, CU=0 and CL=1. When the sensorless signals ZA–ZC are in the third state of ZA–ZC=(0, 1, 1), the commutation control signals AU–CL are AU=0, AL=1, Bu=1, BL=0, Cu=0 and CL=0. When the sensorless signals ZA–Zc are in the fourth state of ZA–ZC=(1, 0, 0), the commutation control signals AU–CL are AU=1, AL=0, BU=0, BL=1, CU=0 and CL=0. When the sensorless signals ZA–ZC are in the fifth state of ZA–ZC=(1, 0, 1), the commutation control signals AU–CL are AU=0, AL=0, BU=0, BL=1, CU=1 and CL=0, When the sensorless signals ZA–ZC are in the sixth state of ZA–ZC=(1, 1, 0), the commutation control signals AU–CL are AU=1, AL=0, BU=0, BL=0, CU=0 and CL=1. The switching transistors 4–9 are on with "1" and off with "0".

The control unit 11 detects the rotation speed of the commutator less DC motor based on the period of rising or falling edge of at least one of the sensorless signals ZA–ZC. The control unit 11 compares the detected rotation speed and the prescribed rotation speed, and as described above, controls the switching means 14 of the rectification means 10 in the off state when the rotation speed of the corimutatorless DC motor is below the prescribed rotation speed and in the on state when the rotation speed of the commutator less DC motor is above the prescribed rotation speed.

Figure 4:
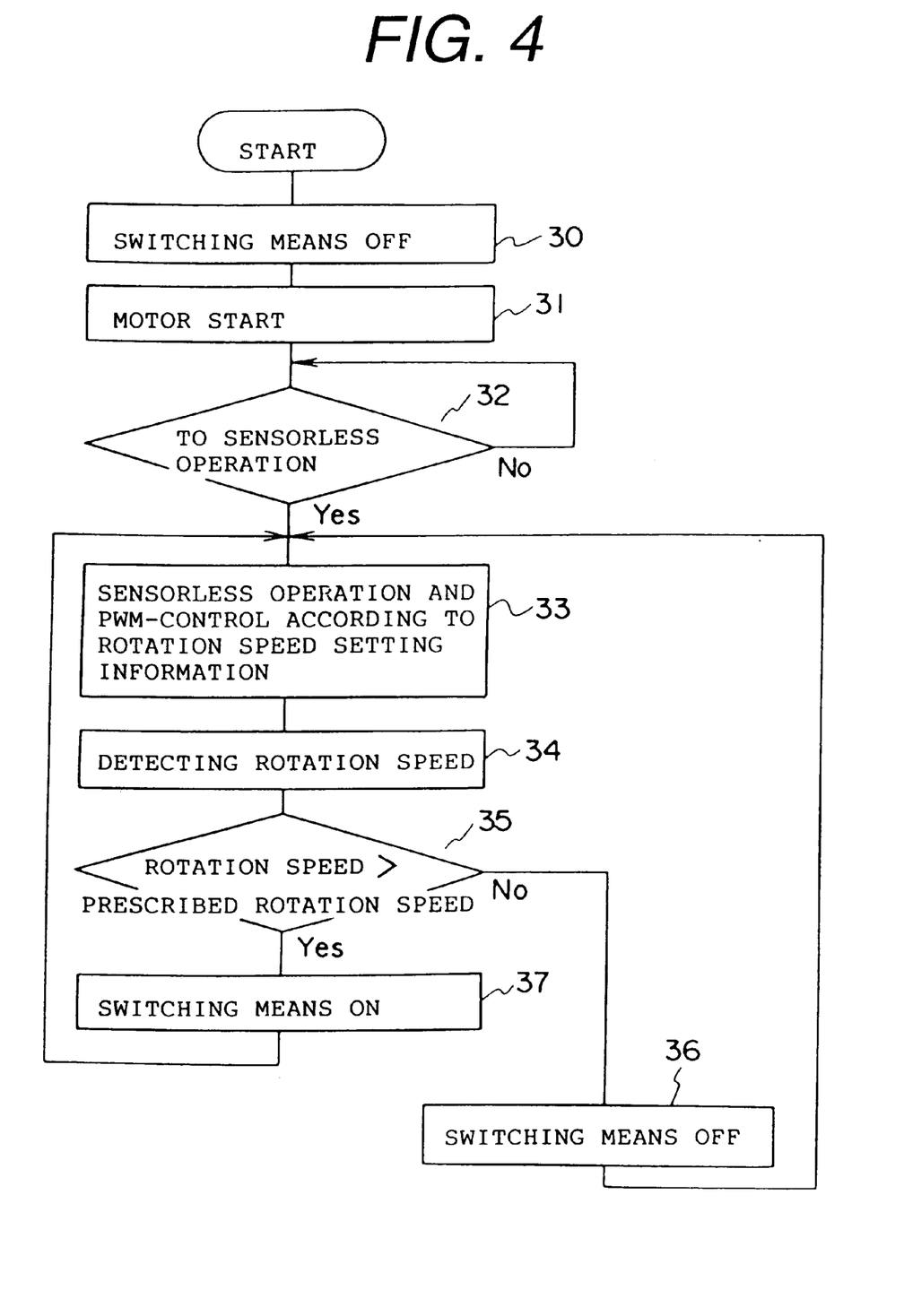
FIG. 4 is a flow chart of a control unit of FIG. 1.

FIG. 4 is a flow chart of the control unit 11 of FIG. 1.

When the start signal is given, the control unit 11 controls the switching means 14 to the off state in a step 30 so that the rectification device 10 performs the full-wave rectification, and starts up the commutator less DC motor in a step 31. As described above, the commutator EC motor is started up by synchronized operation. Thereafter, in a step 32, the control unit 11 determines whether the switching to the sensorless operation is possible based on whether the predetermined time causing the state under which the induced voltages A–C are stably outputted is past or whether the motor attains to the predetermined rotation speed causing the state under which the induced voltages A–C are stably outputted. The control unit 11 enters the sensorless operation of a step 33 by determining in the step 32 that the switching to the sensorless operation is possible. In the step 33, the above-mentioned sensorless operation is performed and the commutation control signals AU–CL are PWM-controlled according to the rotation speed setting information. Hence, the motor is run at a rotation speed according to the rotation speed setting information.

Thereafter, the control unit 11 enters a step 34 and detects the rotation speed of the motor based on the period of the rising or falling edge of at least one of the sensorless signals ZA–ZC. In a following step 35, the control unit 11 determines whether the detected rotation speed is above the prescribed rotation speed. The prescribed rotation speed, as described above, is set for a value below a maximum rotation speed that is available at a full-wave rectified DC voltage. In this embodiment, the full-wave rectified DC voltage is 141V. If the rotation speed of the motor is below the prescribed rotation speed, the control unit 11 enters from the step 35 to a step 36, controls the switching device 14 in the off state, and then returns to the step 33. When the switching device 14 is in the off state, the rectification device 10 performs the full-wave rectification, end in this embodiment, DC voltage of 141V is supplied to the switching transistors 4–9. If the rotation speed of the motor is above the prescribed rotation speed, the control unit 11 enters from the step 35 to a step 37, controls the switching device 14 in the on state, and then returns to the step 33. When the switching device 14 is in the on state, the rectification device 10 performs the voltage-doubler rectification, and in this embodiment, DC voltage of 282V which is the double of 141V is supplied to the switching transistors 4–9.

Thus, when the rotation speed of the motor is below the prescribed rotation speed, the rectification device 10 performs the full-wave rectification, and the DC voltage which is half as compared with a case of a rotation speed above the prescribed rotation speed is supplied to the switching transistors 4–9. Therefore, even when the pulse width of the PWM-controlled commutation control signals AU–CL is decreased due to a low or medium speed control and the width of the voltage pulse impressed to the drive windings 1–3 is decreased, the voltage value of the voltage pulse is half as compared with the case of a rotation speed above the prescribed rotation speed. Because of this, since the motor current is small and its current variation is al,o small, a hysteresis loop due to a variation in magnetic flux becomes small and an iron loss is reduced. Also, since the motor current becomes small at a rotation speed below the prescribed rotation speed as described above, an on loss of the switching transistors 4–9 is reduced. On the other hand, when the rotation speed is above the prescribed rotation speed, the rectification device 10 performs the voltage-doubler rectification, and the DC voltage which is the double of that of the case of a rotation speed below the prescribed rotation speed is supplied. Therefore, a rotation area of the motor is not narrowed. When the rotation speed of the motor is high, the width of the voltage pulse impressed to the drive windings 1–3 becomes large, so the current variation is small. Therefore, an iron loss is not increased.

By an on-off of the switching device 14 inserted between the single-phase bridge rectifier circuit 12 and the condenser circuit 13, two kinds of rectifying outputs, a low voltage and a high voltage, are given. Accordingly, it is possible to give the rectifying outputs of the low voltage and the high voltage with a very simple formation. The diodes D3 and D4 of the single-phase bridge rectifier circuit 12 function actively as rectifying elements in the full-wave rectification, and in the voltage-doubler rectification, function as a protection to prevent the polarity of the condenser circuit 13 from being inverted due to overloading and so on. Hence, the diodes D1–D4 of the single-phase bridge rectifier circuit 12 are effectively utilized regardless of the full-wave rectification or the voltage-doubler rectification.

Figure 5:
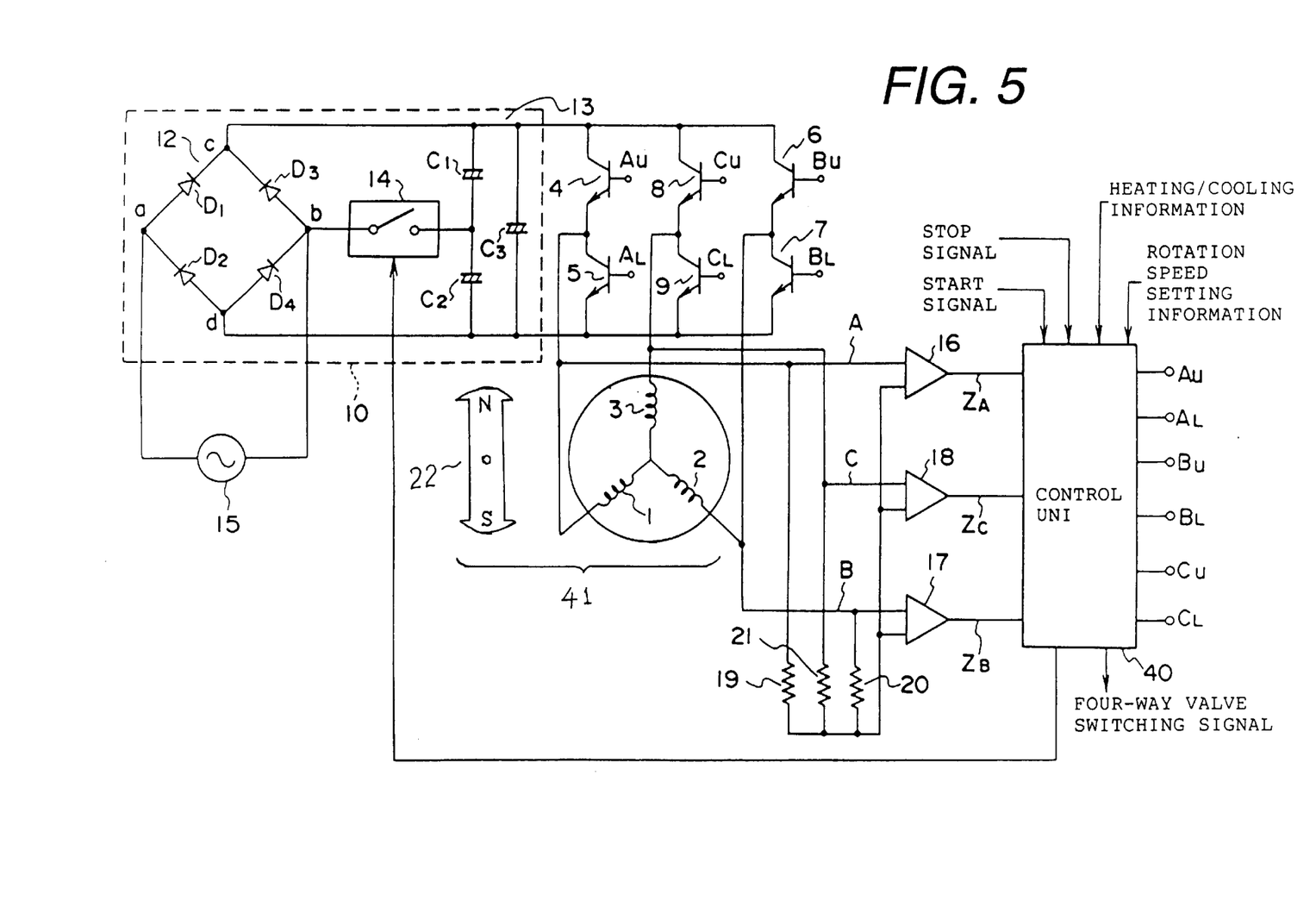
FIG. 5 and FIGS. 6 are a composition drawing showing a second embodiment according to the present invention.
Figure 6:
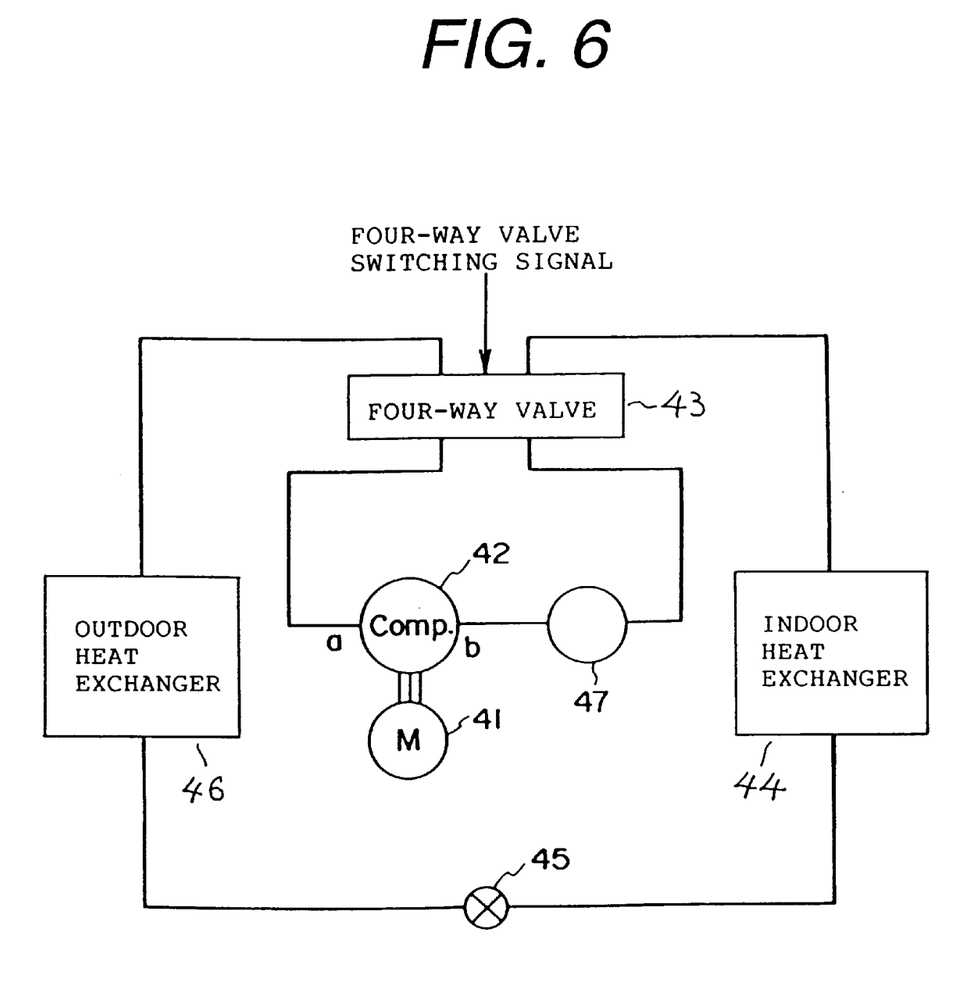

FIG. 5 and FIG. 6 are composition drawings showing a second embodiment according to the present invention, and show a motor driving apparatus of an air-conditioning system. In FIG. 5, the same reference numerals as those of FIG. 1 represent the same.

In the second embodiment, the switching device 14 of the rectification device 10 is on-off-controlled by a control unit 40 so that the rectification device 10 performs the full-wave rectification when the air-conditioning system is in a cooling operation and the rectification device 10 performs the voltage-doubler rectification when the air-conditioning system is in a heating operation. A commutator less DC motor 41 having the drive windings 1–3 and the permanent magnet rotor 22 is, as described in the first embodiment, controlled for the starting and running by the control unit 40, and controlled for a rotation speed by the PWM-control of the commutation control signals AU–CL according to the rotation speed setting information.

The commutator less DC motor 41 drives a compressor 42 of FIG. 6. In FIG. 6, the heating operation or the cooling operation is switched by a four-way valve 43 which is controlled by the control unit 40. In the heating operation, the four-way valve 43 is switched by the control unit 40 so that a heating cycle in which a refrigerant flows through a discharge side a of the compressor 42→the four-way valve 43 →an indoor heat exchanger 44→an expansion valve 45→an outdoor heat exchanger 46→the four-way valve 43 an accumulator 47→a suction side b of the compressor 42 is formed. In the cooling operation, the four-way valve 43 is switched by the control unit 40 so that a cooling cycle in which the refrigerant flows through the discharge side a of the compressor 42→the four-way valve 43→the outdoor heat exchanger 46→the expansion valve 45→the indoor heat exchanger 44→the four-way valve 43→the accumulator 47→the suction side b of the compressor 42 is formed.

The control unit 40 inputs, in addition to the sensorless signals ZA–ZC from the comparators 16–18, the start signal, a stop signal, a heating/cooling information and the rotation speed setting information, and controls a starting and running of the commutator less DC motor 41, a switching of the four-way valve 43 and the on-off of the switching device 14 of the rectification device 10. The stop is a signal for requiring a stop of the air-conditioning system, and the heating/cooling information is a signal for requiring the heating operation or the cooling operation. Other details of the composition are as described with regard to the first embodiment.

Figure 7:
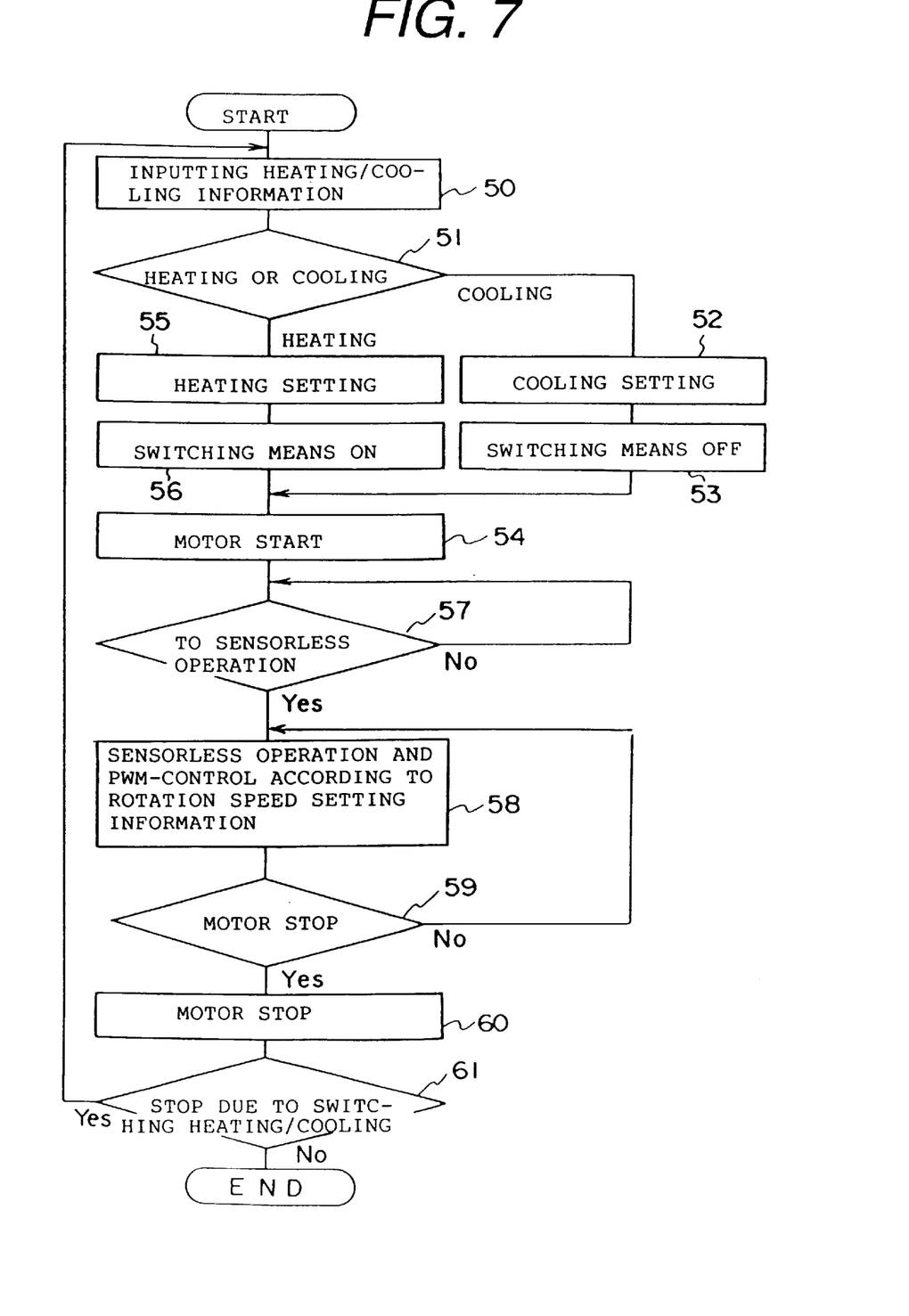
FIG. 7 is a flow chart of a control unit of FIG. 5.

FIG. 7 is a flow chart of the control unit 40 of FIG. 5.

When the start signal is given, the control unit 40 inputs the heating/cooling information in a step 50, and determines the heating operation or the cooling operation in a step 51. If the cooling operation is required, the control unit 40 enters from the step 51 to a cooling setting of a step 52, switches the four-way valve 43 so as to form the cooling cycle, controls the switching device 14 of the rectification device 10 to the off state in a step 53, and then enters a step 54. When the switching device 14 is in the off state, the rectification device 10 performs the full-wave rectification, and in this embodiment, DC voltage of 141V is supplied to the switching transistors 4–9. If the heating operation is required, the control unit 40 enters from the step 51 to a heating setting of a step 5, switches the four-way valve 43 so as to form the heating cycle, controls the switching device 14 of the rectification device 10 to the on state in a step 56, and then enters the step 54. When the switching device 14 is in the on state, the rectification device 10 performs the voltage-doubler rectification, and in this embodiment, DC voltage of 282V which is the double of 141V is supplied to the switching transistors 4–9.

The control unit 40 starts up the commutator less DC motor 41 in the step 54. The commutator less DC motor 41 is, as described in the first embodiment, started up the synchronized operation. Thereafter, in a step 57, the control unit 11 determines whether the switching to the sensorless operation is possible based on whether the predetermined time causing a state under which the induced voltages A–C are stably outputted is past or whether the motor 41 attains to the predetermined rotation speed causing a state under which the induced voltages A–C are stably outputted. The control unit 40 enters the sensorless operation of a step 58 by determining in the step 57 that the switching to the sensorless operation is possible. In the step 58, as described in the first embodiment, the sensorless Operation is performed and the commutation control signals AU–CL are PWM-controlled according to the rotation speed setting information.

Thereafter, the control unit 40 enters a step 59 and determines whether the control unit 40 stops the motor 41. In this embodiment, the stop of the motor 41 is determined when the stop signal is given or when the switching of heating/cooling is done. Accordingly, if the switching from the heating to the cooling or vise versa is performed during running of the motor 41, the stop of the motor 41 is determined. The switching of heating/cooling is recognized based on the heating/cooling information. The control unit 40 returns to the step 58 unless the stop of the motor 41 is determined in the step 59, and continues the sensorless operation of the commutator less DC motor 41. When the stop of the motor 41 is determined, the control unit 40 enters a step 60 and stops the operation of the motor 41, and then goes to a step 61. In the step 61, the control unit 40 determines whether the motor 41 is stopped by the stop signal or the motor 41 is stopped by the switching of heating/cooling. If the stop of the motor 41 is by the stop signal, the control unit 40 finishes the control of FIG. 7. If the of the motor 41 is by the switching of heating/cooling, the control unit 40 returns to the step 50, controls the four-way valve 43 and the switching device 14 of the rectification device 10 according to the switching of heating/cooling, and restarts the starting and the sensorless operation of the commutator less DC motor 41.

Thus, when the air-conditioning system is the cooling operation, the rectification device 10 performs the full-wave rectification, and the DC voltage which is half as compared with the heating operation is supplied to the switching transistors 4–9. Accordingly, even when the pulse width of the commutation control signals AU–CL PWM-controlled is decreased and the width of the voltage pulse impressed to the drive windings 1–3 is decreased, the voltage value of the voltage pulse is half as compared with the heating operation. Because of this, since the motor current is small and its current variation is also small, a hysteresis loop due to a variation in magnetic flux becomes small and an iron loss is reduced. Since it is not necessary in the cooling operation as compared with the heating operation that the motor 41 driving the compressor 42 is driven at a high rotation, the cooling operation is not hindered even when a driving voltage is lowered. Also, as described above, since the motor current is small in the cooling operation, an on loss of the switching transistors 4–9 is reduced. On the other hand, in the heating operation, the rectification device 10 performs the voltage-doubler rectification, and the DC voltage which is the double of that of the cooling operation is supplied. Therefore, the heating operation that necessitates a larger capacity is not hindered at all.

The above-mentioned embodiments have the commutator less DC motor, but it does not limit the scope of the present invention. The present invention can widely be applied to a system for controlling a rotation speed of motor by supplying DC voltage via a PWM-control according to a rotation speed setting information.

From the foregoing it will now be apparent that a new and improved motor driving apparatus has been found. It should be understood of course that the embodiments disclosed are merely illustrative and are not intended to limit the scope of the invention. Reference should be made to the appended claims, therefore, rather than the specification as indicating the scope of the invention.

What is claimed is:

1. A motor driving apparatus for PWM-controlling a DC voltage according to a rotation speed setting information, and driving a motor by voltage pulse chopped by PWM, comprising:

rectification means for full-wave rectifying or voltage-doubler rectifying an AC power source, and supplying a full-wave rectified or voltage-doubler rectified voltage as said DC voltage; and rectification control means, responsive to a rotation speed of said motor, for controlling said rectification means so that said rectification means oscillates between performing the full-wave rectification when a rotation speed of said motor is below a prescribed rotation speed and performing the voltage-doubler rectification when the rotation speed of said motor is above the prescribed rotation speed.

2. The apparatus as claimed in claim 1, wherein:

said rectification means includes a single-phase bridge rectifier circuit to which the AC power source is impressed, a condenser circuit which is charged with the rectified voltage of said single-phase bridge rectifier circuit, and switching means inserted between said single-phase bridge rectifier circuit and said condenser circuit so that the full-wave rectification is performed in an off state and the voltage doubler rectification is performed in an on state; and said rectification control means on-off-controls the switching means of said rectification means.

3. The apparatus as claimed in claim 2, wherein:

said condenser circuit includes first and second condensers connected in series, and a third condenser inserted in parallel with the serial connection of the first and second condensers; and said switching means at its one end is connected between the first and second condensers, and its other end is connected to an input terminal of said single-phase bridge rectification circuit.

4. The apparatus as claimed in claim 1, wherein said prescribed rotation speed is set for a value below a maximum rotation speed that is available at the full-wave rectified DC voltage.

5. The apparatus as claimed in claim 1, wherein said motor is a commutatorless DC motor;

the apparatus further comprising:
sensorless signal generation means, responsive to induced voltages generated in drive windings of said commutatorless DC motor, for generating sensorless signals representative of a zero-cross point of the induced voltages based on the induced voltages and a neutral point potential of said drive windings;

driving means, responsive to said sensorless signal generation means, for generating commutation control signals based on the sensorless signals, and outputting the commutation control signals through PWM control so that said commutatorless DC motor runs at a rotation speed according to the rotation speed setting information; and switching circuit means, responsive to said driving means, for giving the DC voltage supplied from said rectification means to the drive winding of said commutatorless DC motor according to the commutation control signals.

6. The apparatus as claimed in claim 5, wherein said rectification control means detects a rotation speed of said commutatorless DC motor based on a period of a rising or falling edge of at least one of the sensorless signals.

7. The apparatus as claimed in claim 5, wherein:

said rectification means includes a single-phase bridge rectifier circuit to which the AC power source is impressed, a condenser circuit which is charged with the rectified voltage of said single-phase bridge rectifier circuit, and switching means inserted between said single-phase bridge rectifier circuit and said condenser circuit for performing the full-wave rectification in an off state and for performing the voltage-doubler rectification in an on state; and said rectification control means on-off-controls the switching means of said rectification means.

8. The apparatus as claimed in claim 7, wherein:

said condenser circuit includes first and second condensers connected in series, and a third condenser inserted in parallel with the serial connection of the first and second condensers; and said switching means at its one end is connected between the first and second condensers, and its other end is connected to an input terminal of said single-phase bridge rectifier circuit.

9. The apparatus as claimed in claim 5, wherein said prescribed rotation speed is set for a value below a maximum rotation speed that is available at the full-wave rectified DC voltage.

10. The apparatus as claimed in claim 5, wherein said driving means includes:

actual zero-cross time detecting means, responsive to said sensorless signal generation means, for detecting an actual zero-cross time which represents an actual time width from a start of a current commutation period till a generation of a rising or falling edge of said sensorless signals;

commutation control signal output means for setting a commutation timing based on the current commutation period, and outputting commutation control signals when the commutation timing is reached;

reference zero-cross time setting means for setting a reference zero-cross time, which represents a desirable time width from the start of the current commutation period until a rising or falling edge of said sensorless signals which should be generated, based on the current commutation period; and commutation period determining means, responsive to said actual zero-cross time detecting means and said reference zero-cross time setting means, for determining a next commutation period based on the actual zero-cross time and the reference zero-cross time.

11. The apparatus as claimed in claim 10, wherein said reference zero-cross time setting means sets the reference zero-cross time according to the following calculation formula:

$$tref = (j/k) \cdot Tn\text{-}1$$

Where, tref is the reference zero-cross time, $(j/k) \cdot Tn\text{-}1$ is a time width to the j-th of the equally divided k parts of the current commutation period Tn-1.

12. The apparatus as claimed in claim 11, wherein said commutation period determining means determines the next commutation period according to the following calculation formulas:

$$\Delta tn\text{-}1 = tref - tact$$

$$Tin = Ki \cdot \Delta tn\text{-}1 + Tin\text{-}1$$

$$Tn = Kp \cdot \Delta tn\text{-}1 + Tin$$

Where, $\Delta tn\text{-}1$ is a difference between the reference zero-cross time tref and the actual zero-cross time tact, Tin is an integrated value of the next commutation period, Ki is an integration constant, Tin-1 is an integrated value of the current commutation period, Tn is the next commutation period, and Kp is a proportional constant.

13. The apparatus as claimed in claim 10, wherein said commutation control signal output means has the commutation control signals previously assigned according to a state of said sensorless signals, and outputs the commutation control signals corresponding to the state of said sensorless signals.

14. A motor driving apparatus, having a motor for driving a compressor of an air-conditioning system, for PWM-controlling a DC voltage according to a rotation speed setting information, and driving the motor by voltage pulse chopped by PWM, comprising:

rectification means for full-wave rectifying or voltage-doubler rectifying an AC power source, and supplying a full-wave rectified or voltage-doubler rectified voltage as said DC voltage; and rectification control means, responsive to a heating/cooling information demanding a heating or cooling operation of said air-conditioning system, for controlling said rectification means so that said rectification means performs the full-wave rectification when said air-conditioning system is in the cooling operation and performs the voltage-doubler rectification when said air-conditioning system is in the heating operation.

15. The apparatus as claimed in claim 14, wherein:

said rectification means includes a single-phase bridge rectifier circuit to which the AC power source is impressed, a condenser circuit which is charged with the rectified voltage of said single-phase bridge rectifier circuit, and switching means inserted between said single-phase bridge rectifier circuit and said condenser circuit so that the full-wave rectification is performed in an off state and the boltage-doubler rectification is performed in an on state; and said rectification control means on-off-controls the switching means of said rectification means.

16. The apparatus as claimed in claim 15, wherein:

said condenser circuit includes first and second condensers connected in series, and a third condenser inserted in parallel with the serial connection of the first and second condensers; and said switching means at its one end is connected between the first and second condensers, and its other end is connected to an input terminal of said single-phase bridge rectifier circuit.

17. The apparatus as claimed in claim 14, wherein said rectification control means controls said rectification means based on the heating/cooling information prior to a starting of said motor.

18. The apparatus as claimed in claim 14 further including motor stop means, responsive to the heating/cooling information, for stopping said motor when a switching of heating/cooling is performed during a driving of said motor, while said rectification control means is controlling said rectification means.

19. The apparatus as claimed in claim 14, wherein said motor is a commutatorless DC motor;

the apparatus further comprising:

sensorless signal generation means, responsive to induced voltages generated in drive windings of said commutatorless DC motor, for generating sensorless signals representative of a zero-cross point of the induced voltages based on the induced voltages and a neutral point potential of said drive windings;

driving means, responsive to said sensorless signal generation means, for generating commutation control signals based on the sensorless signals, and outputting the commutation control signals through PWM control so that said commutatorless DC motor runs at a rotation speed according to the rotation speed setting information; and switching circuit means, responsive to said driving means, for giving the DC voltage supplied from said rectification means to the drive windings of said commutatorless DC motor according to the commutation control signals.

20. The apparatus as claimed in claim 19, wherein:

said rectification means includes a single-phase bridge rectifier circuit to which the AC power source is impressed, a condenser circuit which is charged with the rectified voltage of said single-phase bridge rectifier circuit, and switching means inserted between said single-phase bridge rectifier circuit and said condenser circuit for performing the full-wave rectification in an off state and for performing the voltage-doubler rectification in an on state; and said rectification control means on-off-controls the switching means of said rectification means.

21. The apparatus as claimed in claim 20, wherein:

said condenser circuit includes first and second condensers connected in series, and a third condenser inserted in parallel with the serial connection of the first and second condensers; and said switching means at its one end is connected between the first and second condensers, and its the other end is connected to an input terminal of said single-phase bridge rectifier circuit.

22. The apparatus as claimed in claim 19, wherein said driving means includes:

actual zero-cross time detecting means, responsive to said sensorless signal generation means, for detecting an actual zero-cross time which represents an actual time width from a start of a current commutation period till a generation of a rising or falling edge of said sensorless signals;

commutation control signal output means for setting a commutation timing based on the current commutation period, and outputting commutation control signals when the commutation timing is reached;

reference zero-cross time setting means for setting a reference zero-cross time, which represents a desirable time width from the start of the current commutation period until a rising or falling edge of said sensorless signals which should be generated, based on the current commutation period; and commutation period determining means, responsive to said actual zero-cross time detecting means and said reference zero-cross time setting means, for determining a next commutation period based on the actual zero-cross time and the reference zero-cross time.

23. The apparatus as claimed in claim 22, wherein said reference zero-cross time setting means sets the reference zero-cross time according to the following calculation formula:

$$tref = (j/k) \cdot Tn\text{-}1$$

Where, tref is the reference zero-cross time, $(j/k) \cdot Tn\text{-}1$ is a time width to the j-th of the equally divided k parts of the current commutation period Tn-1.

24. The apparatus as claimed in claim 23, wherein said commutation period determining means determines the next commutation period according to the following calculation formulas:

$$\Delta tn\text{-}1 = tref - tact$$

$$Tin = Ki \cdot \Delta tn\text{-}1 + Tin\text{-}1$$

$$Tn = Kp \cdot \Delta tn\text{-}1 + Tin$$

Where, $\Delta tn\text{-}1$ is a difference between the reference zero-cross time tref and the actual zero-cross time tact, Tin is an integrated value of the next commutation period, Ki is an integration constant, Tin-1 is an integrated value of the current commutation period, Tn is the next commutation period, and Kp is a proportional constant.

25. The apparatus as claimed in claim 22, wherein said commutation control signal output means has the commutation control signals previously assigned according to a state of said sensorless signals, and outputs the commutation control signals corresponding to the state of said sensorless signals.

26. The apparatus as claimed in claim 19, wherein said rectification control means controls said rectification means based on the heating/cooling information prior to a starting of said motor.

27. The apparatus as claimed in claim 19 further including motor stop means, responsive to the heating/cooling information, for stopping said commutatorless DC motor when a switching of heating/cooling is performed during a driving of said commutatorless DC motor, while said rectification control means is controlling said rectification means.

28. A method for PWM-controlling a DC voltage according to a rotation speed setting information, and driving a motor by voltage pulse chopped by PWM, comprising the steps of:

(a) full-wave rectifying or voltage-doubler rectifying an AC power source;

(b) supplying a full-wave rectified or voltage-doubler rectified voltage as the DC voltage; and (c) oscillating, responsive to a rotation speed of the motor, between performing the full-wave rectification when a rotation speed of the motor is below a prescribed rotation speed and performing the voltage-doubler rectification when the rotation speed of the motor is above the prescribed rotation speed.

29. A method for PWM-controlling a DC voltage according to a rotation speed setting information, and driving a motor by voltage pulse chopped by PWM, comprising the steps of:

(a) full-wave rectifying or voltage-doubler rectifying an AC power source;

(b) supplying a full-wave rectified or voltage-doubler rectified voltage as the DC voltage; and (c) controlling steps (a) and (b) responsive to a heating/cooling information demanding a heating or cooling operation, to perform the full-wave rectification when the air-conditioning system is in a cooling operation and performing the voltage-doubler rectification when the air-conditioning system is in the heating operation.

* * * * *